Oct. 7, 1924.
G. N. REEVES
1,511,066
POISON APPLYING DEVICE
Filed April 15, 1922    2 Sheets-Sheet 1
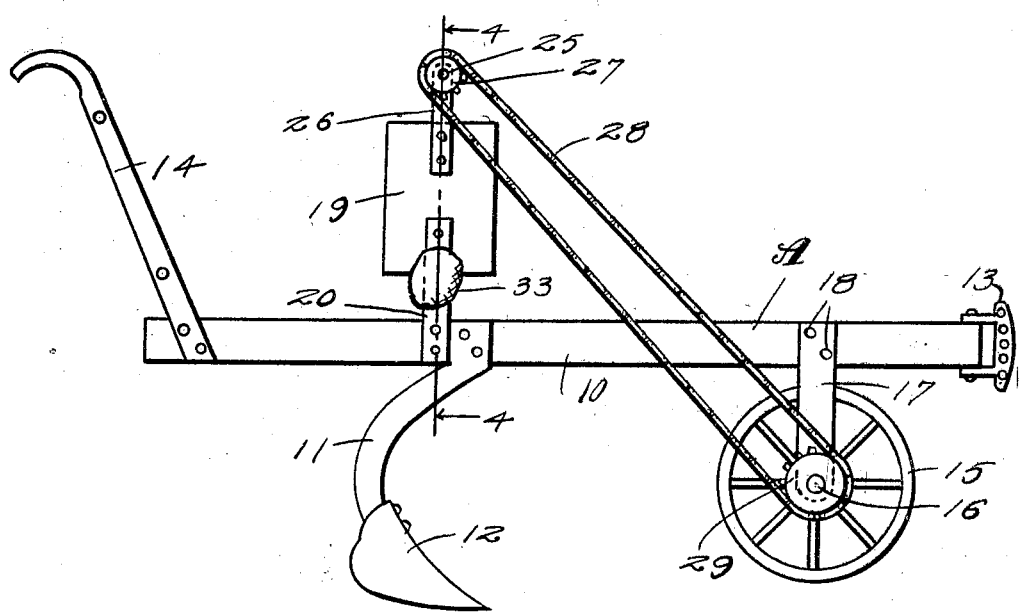
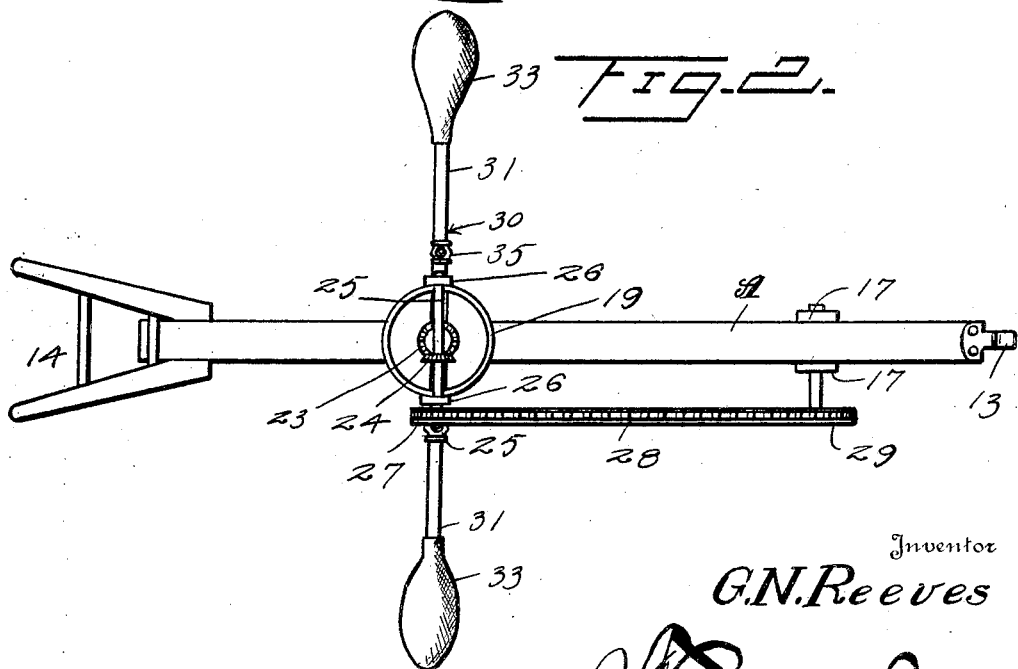
Inventor
G.N. Reeves
By
Attorney Oct. 7, 1924.
G. N. REEVES
POISON APPLYING DEVICE
Filed April 15, 1922    2 Sheets-Sheet 2
1,511,066
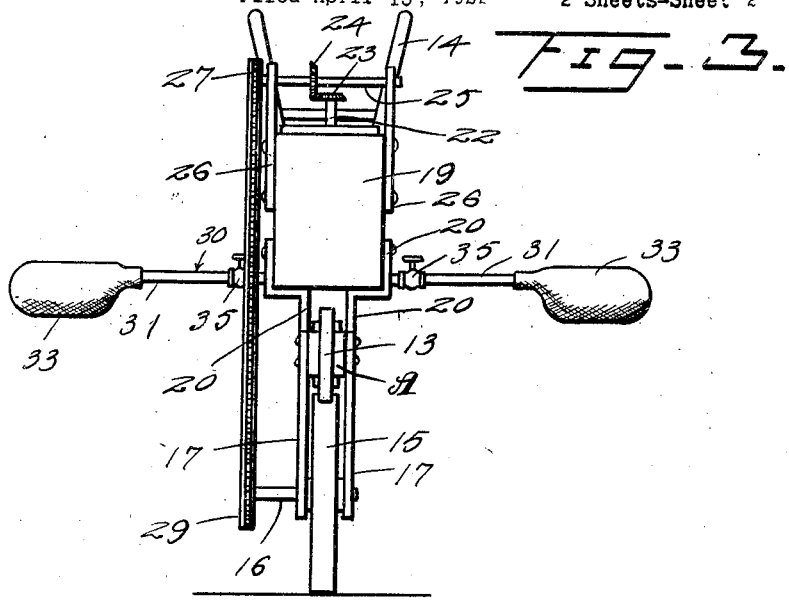
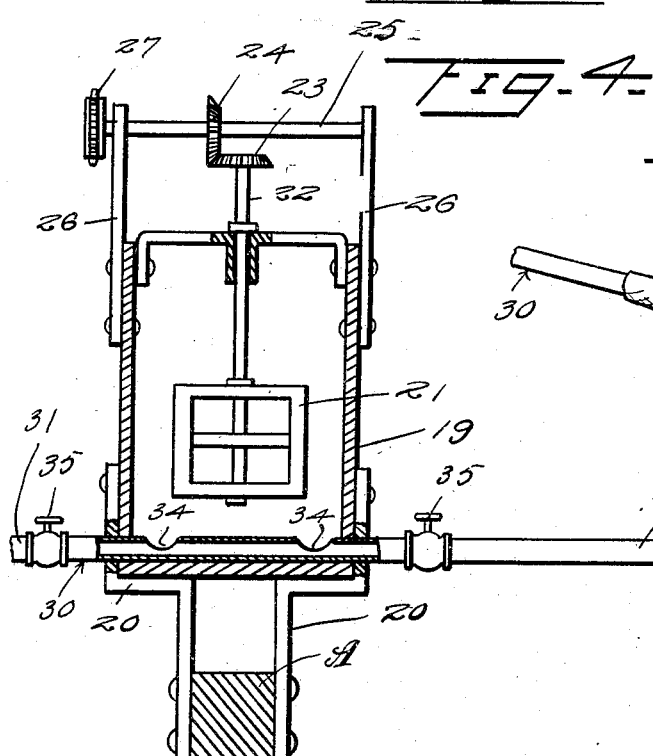
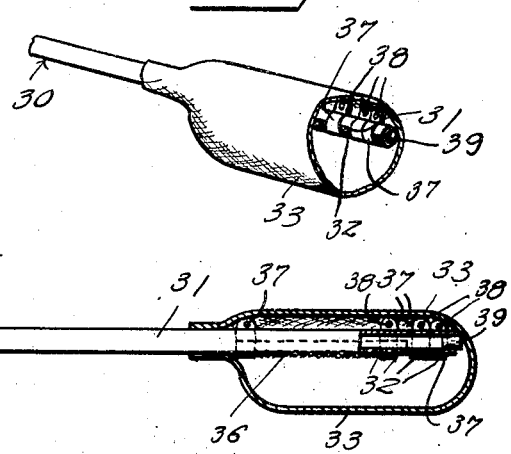
Inventor
G.N. Reeves
By
Attorney Patented Oct. 7, 1924.

1,511,066

UNITED STATES PATENT OFFICE.

GEORGE N. REEVES, OF MAUK, GEORGIA.

POISON-APPLYING DEVICE.

Application filed April 15, 1922. Serial No. 553,096.

*To all whom it may concern:*

Be it known that I, GEORGE N. REEVES, a citizen of the United States, residing at Mauk, in the county of Marion and State of Georgia, have invented certain new and useful Improvements in Poison-Applying Devices; and I do hereby declare the following to be a full, clear, and exact description of the invention, such as will enable other skilled in the art to which it appertains to make and use the same.

This invention relates to a machine for smearing or applying poison molasses and the like to cotton plant in order to exterminate boll weevils and particularly to the means for applying the poison to the plants.

It is aimed to provide a device which will avoid waste of the poison in that the same will be applied only through wiping contact of one or more applicators or brushes with the plants.

Another object is to provide such a machine having an outlet nozzle enclosed by a suitable fabric adapted to catch the poison as it drips from the nozzle and become permeated therewith so as to apply the same to plants with which the fabric may wipe or contact.

Additional objects and advantages will become apparent from a consideration of the description following taken in connection with accompanying drawings illustrating one practical embodiment.

In said drawings:—

Figure 1 is a side elevation of a machine embodying my improvement;

Figure 2 is a plan view thereof;

Figure 3 is a front elevation;

Figure 4 is a vertical sectional view on an enlarged scale taken on the line 4—4 of Figure 1 and through the molasses container, and Figure 5 is an enlarged detail perspective view of one of the applicators, a portion of the fabric covering being removed to disclose details.

Like reference characters designate like or similar parts in the different views of the drawings.

By way of example, I have shown my improvement applied to a plow which is generally designated A. This plow consists of a beam at 10 from which a standard 11 depends and to which the plow share 12 is secured. A clevis 13 is applied to the forward end of the beam 10 whereby the same may be hitched with a draft means. A handle construction 14, to facilitate guiding is used at the rear of the beam. The illustration of the plow is to be taken as conventional inasmuch as my improvements may be incorporated not only in plows but with other agricultural implements as will be understood.

Adjacent the forward end of the plow a wheel or roller 15 is provided adapted to travel on the surface of the soil and which is mounted on a shaft or axle 16 journalled in suitable bearings or hangers 17 depending from the beam 10 and secured thereto as at 18.

Resting on the beam 10 at a distance in the rear of the wheel 15 is a container or receptacle 19 which may be rigidly secured to the beam 10 by means of suitable brackets as at 20. Operable within the receptacle 19 is a suitable rotatable agitator 21 having a shaft 22 which rises above the receptacle. On the shaft 22 a bevel gear wheel 23 is provided which meshes with a bevel gear wheel 24 keyed or fixed on a shaft 25. Shaft 25 is journaled in bearing arms 26 which may rise from the receptacle 19. Keyed to the shaft 25 is a sprocket wheel 27 traversed by a sprocket chain 28 which also is trained over a sprocket wheel 29 keyed or otherwise rigid with the shaft 16 and with the wheel 15.

Disposed radially of the receptacle 19 and preferably extending on opposite sides thereof at any desired length or distance, is a pipe 30 whose extremities form nozzles 31 which are provided with any suitable number and sizes of outlet or discharge orifices 32. The nozzles 31 are enclosed by suitable fabric or equivalent porous envelopes 33.

The receptacle 10 may be open at its upper end as shown to permit the filling thereof with poison molasses or any other suitable poison or material. The pipe 30 has inlet ports at 34 in communication with the interior of the receptacle and exteriorly of the receptacle, regulating and cut off valves 35 of any desired construction are provided.

In use as a plow is drawn along, traction of the wheel 15 with the soil will rotate it and accordingly rotate the sprocket 25 causing the chain 28 to travel which rotates sprocket wheel 27, shaft 25, gear wheels 24, 23, shaft 22 and the agitator 21. The agitator maintains the poison molasses effectively stirred and serves to facilitate its passage through the ports 34 into pipe 30 and nozzles 31, from which it emerges through the orifices 32 and drips on to the envelopes 33 which become saturated therewith. The envelopes or applicators 33 contact with and move over the cotton plants and accordingly the poison molasses is applied thereto by wiping contact or smearing action for the purpose of exterminating boll weevils.

It will be realized that the action of applying the poison molasses may be effected incidental to the plowing or otherwise treating of the soil or the plants. In addition, the applicators will hold the poison molasses which drips from the nozzles until it is applied directly to the plant, thus avoiding the waste which would ensue if the poison dripped directly from the orifices 32 on to the plant or ground.

Poison molasses is referred to merely by way of example as other exterminating material may be used and for instance gasoline. When the latter is employed, a wire or other gauze 36 may be secured over the openings or orifices 32 so as to prevent too free flow of the gasoline. Removable U-shaped clip clamps 37, using adjustable bolts 38 at their terminals, may fasten the gauze 36 in place. Also said clamps may be used in any preferred numbers with or without the gauze in order to close one or more of the openings 32 so as to vary the quantity of material discharged. As one means of closing the outer ends of the nozzles 31, removable plugs 39 may be inserted thereinto.

As merely one practical embodiment has been illustrated and described, it is to be understood that changes within the details may be resorted to provided they fall within the spirit and scope of the invention.

I claim as my invention:—

1. In an applying mechanism of the class described, a nozzle, a foraminous envelope reduced at one end to provide a constricted opening, the discharge portion of the nozzle being passable through said opening and disposed within the larger portion of the envelope and means on said discharge portion and within the envelope operable to regulate the discharge.

2. In an applying mechanism of the class described, a nozzle, a foraminous envelope in which the discharge end of said nozzle is disposed, a foraminous means within the envelope and disposed over the discharge opening of the nozzle, and means adjustably securing said foraminous means to said pipe and capable of closing certain of said openings.

In testimony whereof I affix my signature in presence of two witnesses.

GEORGE N. REEVES.

Witnesses:
R. L. GORDON,
P. H. MOUFORT.